A. F. FIELDS.
GAME APPARATUS.
APPLICATION FILED OCT. 16, 1913.

1,139,356.

Patented May 11, 1915.
9 SHEETS—SHEET 1.

Witnesses
Ada J. Dowell
Moselle A. Fields

Inventor
Albert Franklin Fields.
By Robbs Robb
Attorneys

Figure 2:
Figure 2:
Figure 2:
Figure 2:
Figure 2:
Figure 2:

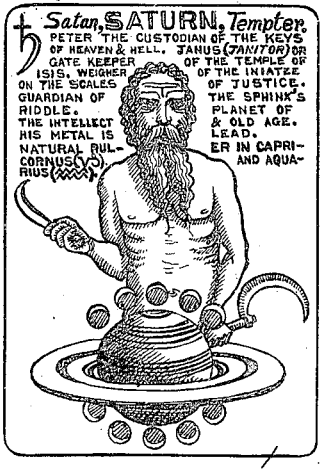
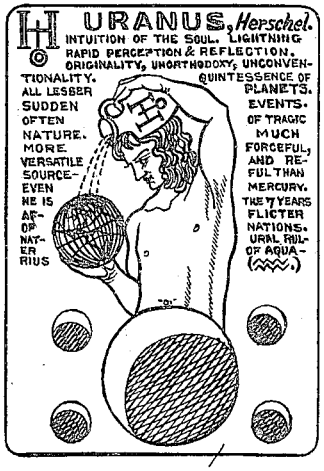
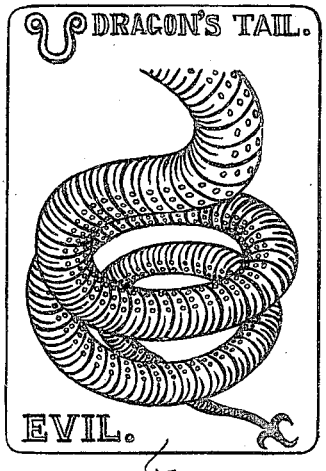
Fig. 2ª

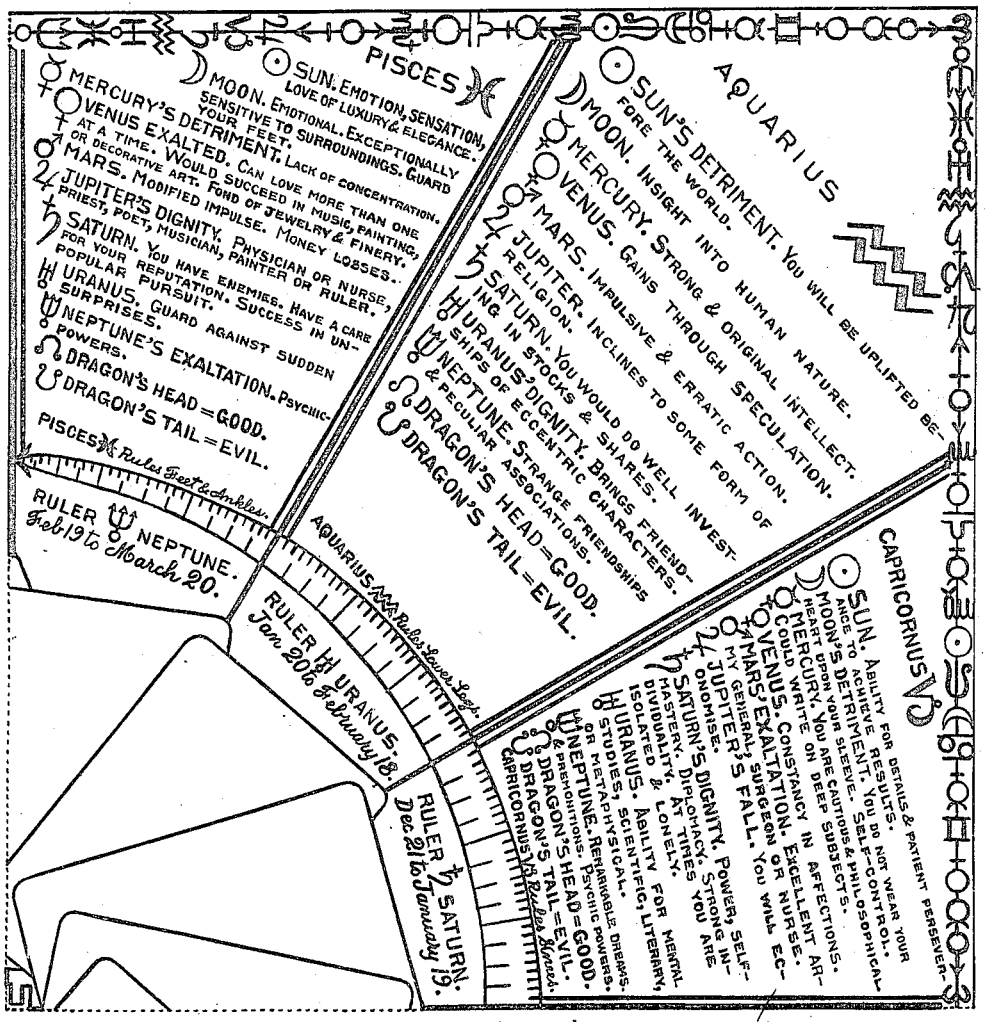

UNITED STATES PATENT OFFICE.

ALBERT FRANKLIN FIELDS, OF ALHAMBRA, CALIFORNIA.

GAME APPARATUS.

1,139,356.  Specification of Letters Patent.  Patented May 11, 1915.

Application filed October 16, 1913. Serial No. 795,569.

*To all whom it may concern:*

Be it known that I, ALBERT FRANKLIN FIELDS, a citizen of the United States, residing at Alhambra, in the county of Los Angeles and State of California, have invented certain new and useful Improvements in Game Apparatus, of which the following is a specification.

The present invention relates to games, and in particular to playing cards.

The primary object in mind is the provision of a game of this character which will be educational in its nature and appealing especially to the intelligent and artistic elements of those interested in its playing.

In carrying out the idea of the invention, the science of astronomy and astrology is employed as its foundation, the cards of which the game is composed representing the "cosmos" or universe, comprising a plurality of correlated suits depicting the astrological divisions of the zodiac signs and the solar system's planets, with due regard for relative power or importance of one division to the other division, and of the planets to the solar orb, according to "a table of values" hereinafter more fully set forth.

Carrying out still further the allusionary theme according to the teachings of astrology, the planet under which a man is born is supposed to decide his temperament and the particular position of planets to be decisive of his destiny. Some of these conditions reach man through the houses of the zodiac belt represented by certain cards of four suits of the playing cards, which are signified by a name and number on the face of the spot-cards.

Bearing in mind, the foregoing, it is contemplated to provide as a coöperating element of the game, a chart or diagram (hereinafter referred to as the wheel of destiny) delineating certain human characteristics bearing a direct mechanical relation to the indicia on the cards, the association of the words or names with the numbers, as shown thereon, when predetermined ones are disposed on said chart, affording a character study or means of telling one's fortune.

Figure 1:
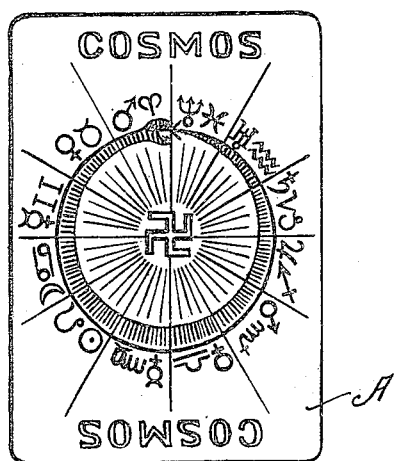
Figure 3:
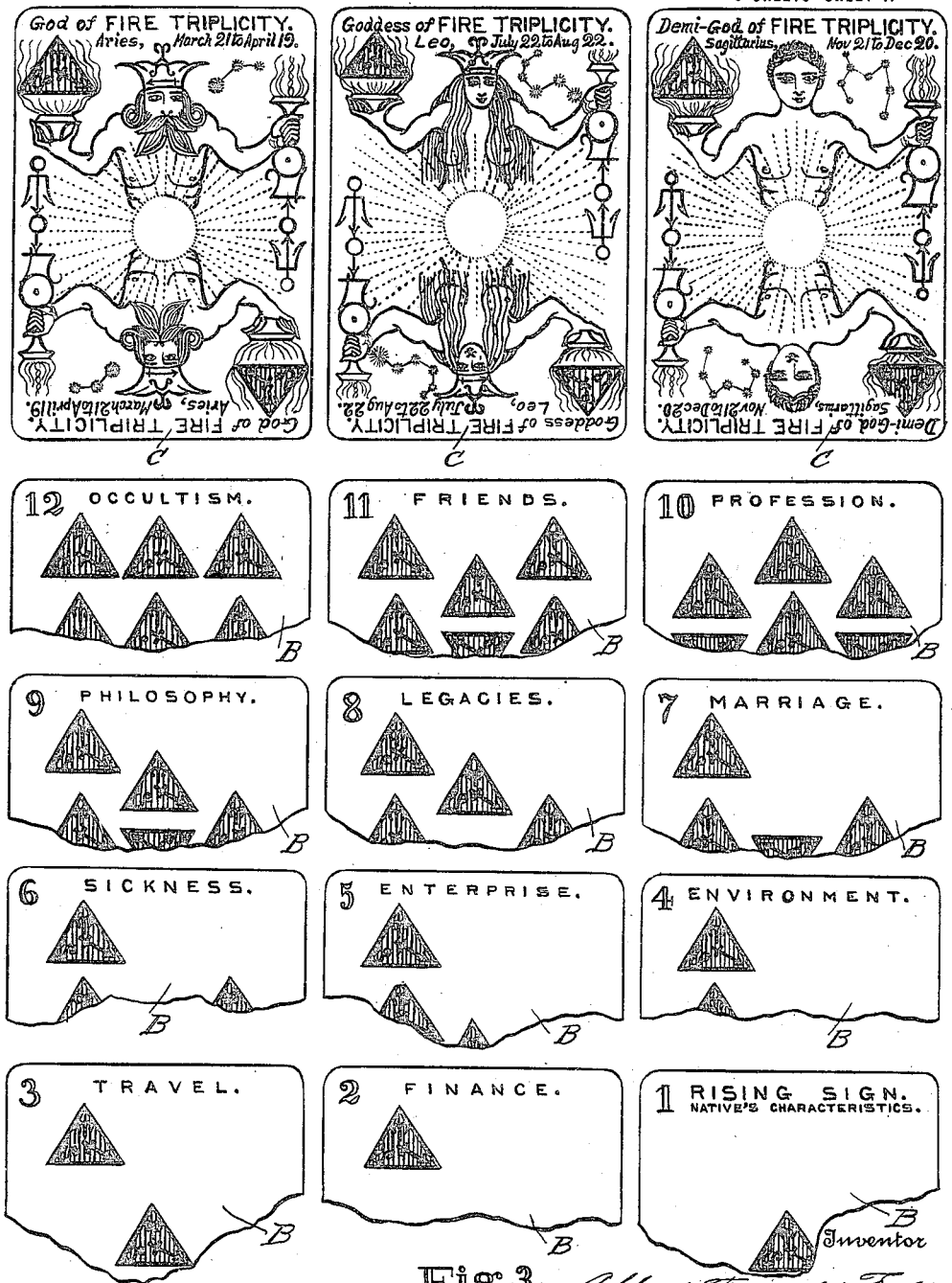
Figures 4, 5, 6:
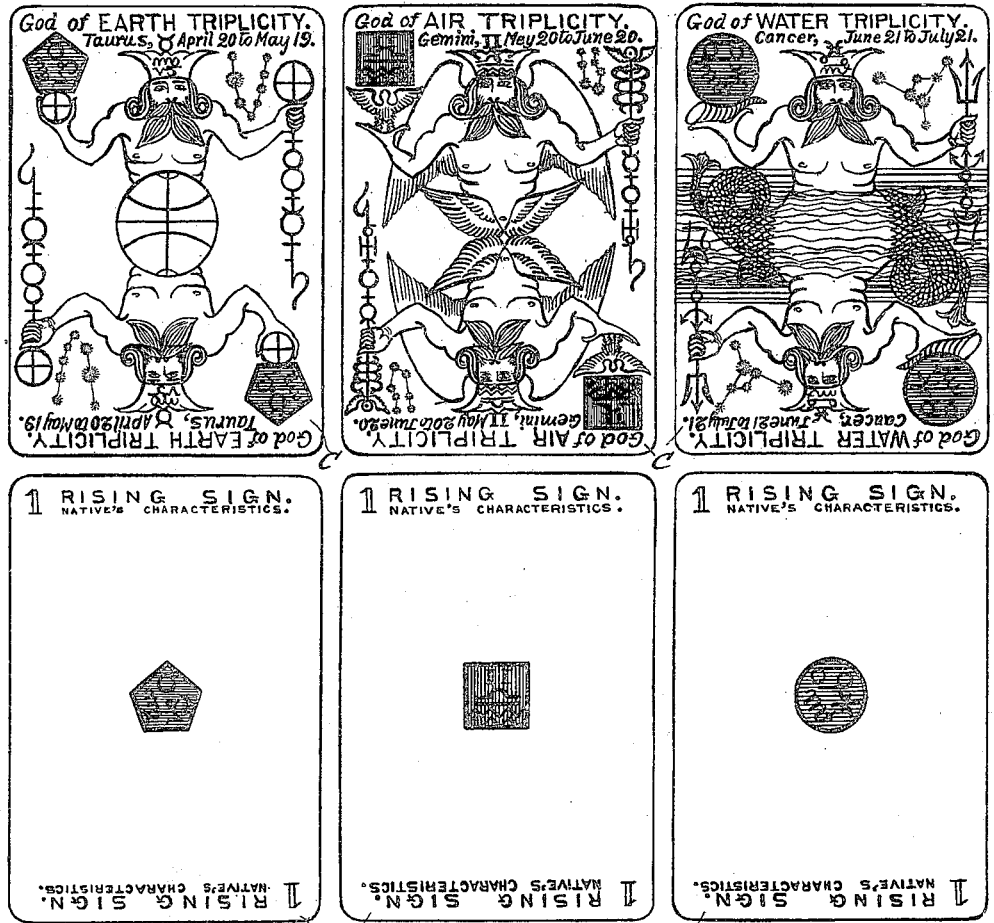
Figure 7:
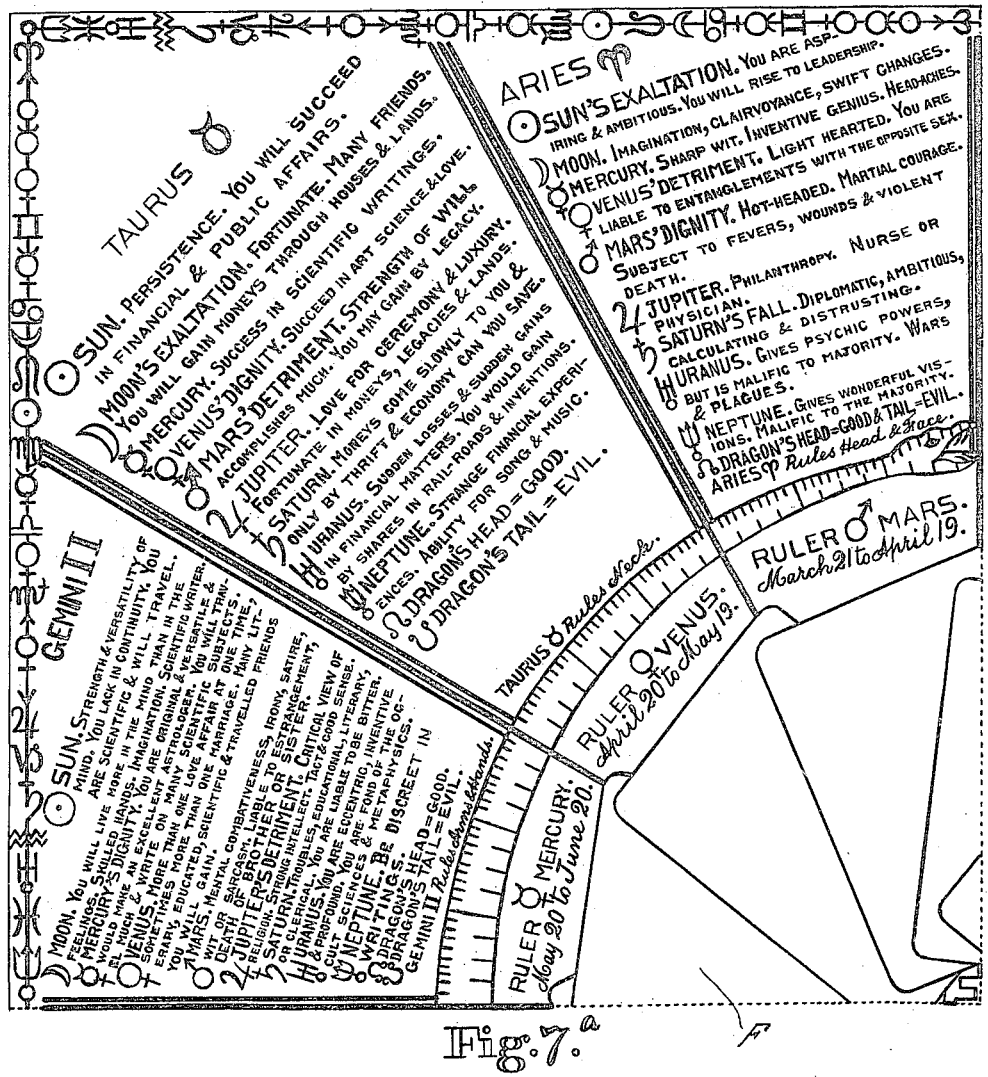
Figure 7:
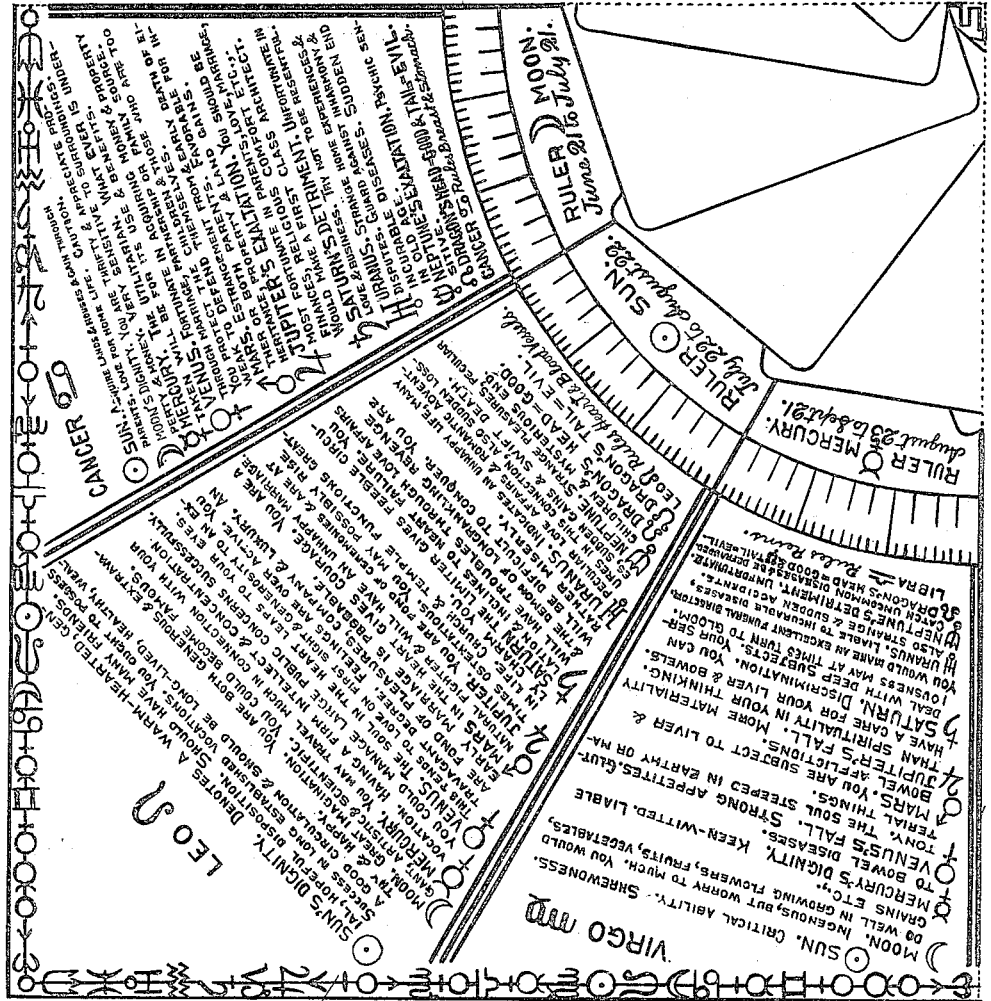
Figure 7:
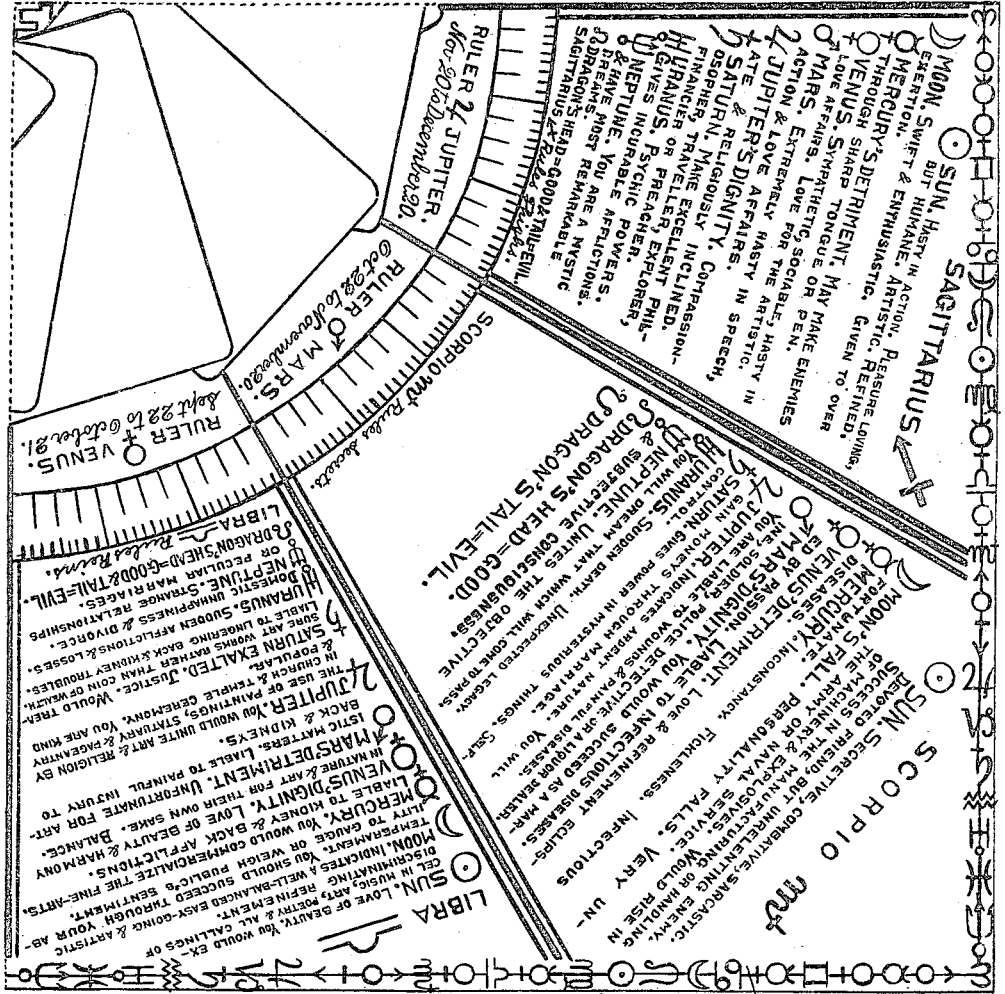

For a full understanding of the invention, reference is to be had to the following description, and the accompanying drawings, in which:

Figure 1 is a plan view of the "cosmos" or universe card. Figs. 2 and 2ª are plan or face views of the series of twelve planet cards. Fig. 3 is a view illustrating all of the cards of one of the element suits, namely that representative of the fire element, the picture cards being completely illustrated and the pip or spot cards being broken away. Figs. 4, 5 and 6 are respectively face or plan views of one picture and one spot card of the earth, air and water element suits. Figs. 7ª, 7ᵇ, 7ᶜ, and 7ᵈ, are each a front or plan view of one quarter section of the fortune reading diagram or chart, termed the "wheel of destiny".

A clear description of certain individual cards and suits of the cards with respect to illustrations and indicia thereon is necessary to a clear comprehension of the nature of the game and the relation of one card to another.

The pack of cards comprising the game of my invention consists of seventy-three cards, all suitably inscribed with pictorial illustrations and other indicia referring to and carrying out the astrological significations and may be qualified as comprising a "cosmos" card A, four suits of element cards, B, C, fifteen in number to each suit, and one suit of planet cards D and E numbering twelve. The "cosmos" card is highest in value and bears upon its face a miniature in many respects of the chart or wheel of destiny G hereinafter to be more fully described. This card is always a trump card, with power to take any trick that may be played, and it may be held or played at any time as the holder of the same deems best, unless, of course, it is the last card in the hand and when it is played it calls for the highest trump card, or in the event of no trump card, the highest non-trump card of each player. It will be observed by reference to the drawing that the illustration of this card contains a wheel like representation of the "cosmos" or universe, as represented by the divisions of the zodiac or fixed constellations. A large serpent encircles this with head and tail meeting, which serpent illustration is divided into 144 sub-divisions of two and a half degrees each, there being twelve sub-divisions to each of its twelve zodiac sign divisions. Just outside of the circle and corresponding with the different parts of the serpent are placed in their natural order the twelve signs of the zodiac each having its own symbol and also within its own space the sign or symbol of the planet which is said to be its natural ruler.

The name "Cosmos" is printed preferably in the three primary or cosmic colors that white or light of creative or cosmic principle is vibratory to, namely, red, yellow and blue. In other words, red, yellow and blue, three primary colors, being elements of a ray of light, as demonstrated by a prism, are therefore, vibratory to light, (white light), which light is not only representative of, but is the creative light, or cosmic-principle.

Once upon a time there was chaos, or darkness, and the Creator said, "Let there be light, and there was light". This was the light of creative principle,—cosmic principle, or the primary cause of our present visible cosmos. Astrology recognizes colors and forms to be cosmic manifestation.

The rainbow is a natural example of the refraction of the white light of the sun, which is a vibration or response to the creative or cosmic principle. For example, if our sun's light should die out completely, in time there would be no visible life, whether of flora or fauna on our earth, nor would there be any manifestation of colors, whatsoever. All would be darkness, death as it were, or the negation of light and life, the negation of the creative or cosmic-principle, as cognized by the objective or physical consciousness of man.

The four element suits represent the four elements of fire, earth, air and water, each suit comprising twelve pip, spot or divisional cards B indicative of the twelve houses of the zodiac belt and three triplicity cards C representative of the ruling god, goddess, and demi-god of one of the four elements, each element having a distinctive design in color. Describing, for example, one of such suits, it will be observed from the drawing that the fire element suit consists of triangular design in red and black, the spot or divisional cards having from one to twelve of these small designs together with a corresponding number in two of the corners of each of them, and also a qualifying name representative of each of these card corner numbers and of the number of the divisional card, viz. 1—rising sign; 2—finance; 3—travel; 4—environment; 5—enterprise; 6—sickness; 7—marriage; 8—legacies; 9—philosophy; 10—profession; 11—friends; 12—occultism. The triplicity cards of the suit not only have the element design but also an illustration of a god, goddess, and a demi-god, each grasping in the left-hand a scepter composed of the symbols representative of the particular three or four ruling planets of the suit, and a flaming torch. The triplicity cards of each of these suits also show in the right-hand of the illustrated figure one of the symbols of the four elements in accordance with the particular element they individually represent, namely, fire, flame; earth, globe; air, winged eagle; and water, conch shell. The two reversed human-like half figures on each of the triplicity cards are connected at their waists by a design further illustrating their particular elements, namely, fire, a blazing sun in black and gold; earth, a globe in black and blue; air, two pairs of wings in black and gold; and water, two lower halves of fishes in black and green in ocean. All of the gods and goddesses' heads are crowned with golden crowns decorated by the individual symbols of the zodiac signs belonging to their particular element triplicity. The heads of the demi-gods are crowned with green leaved wreaths. In addition to the foregoing all of the twelve element triplicity gods, goddesses and demi-gods cards have severally a design of the particular constellation belonging to each individually together with the names and dates of the months that include for each a zodiac sign's period of time, a circle's section, each specifically, thirty degrees of twelve subdivisions.

There are twelve constellations of fixed stars in the zodiac belt. Each of the twelve element triplicity cards has a small diagram of one of these constellations, the constellation on each being the one belonging to the sign represented by the particular triplicity card upon which the diagram appears. For instance, the card, god of fire triplicity, has the diagram of the constellation Aries, which belongs to the fire triplicity represented by this card.

An element triplicity card contains the zodiac sign name as well as the constellation diagram, of the zodiac sign represented by the card. The card mentioned above, (god of fire triplicity), has the name of the zodiac sign, Aries, which it represents, as well as having the diagram of the Aries constellation, while in addition, it has the dates belonging to that period, those from March 21st to April 19th inclusive, which is a zodiac sign's period of time, at that season of the year. There being three hundred and sixty-five days in the year, and just twelve zodiac signs, the signs average about thirty days in time, varying a little, according to the season of the year. Furthermore, there being twelve zodiac signs of thirty degrees each, they are each a section of the circle, 360 degrees, called the zodiac belt. Each of these sections of thirty degrees contains twelve sub-divisions.

Specifically describing the remaining suit of cards, namely the planet suit, it will be observed by reference to the drawings that ten of the same denoted D are illustrated individually with their respective globes some with and some without satellites, and all of them with human-like figures representing personifications of them. The remaining two, denoted E, are complemental cards collectively representing a dragon, one of said cards illustrating the head, while the other depicts the tail of the beast. The dragon cards have a peculiar relation to the other planet cards as will be hereinafter more fully described. In addition to the zodiac signs and astronomical and astrological illustrations upon these planet cards, each bears certain printed indicia which relates to the chart hereinbefore referred to and as will be more clearly understood as the description proceeds.

It has already been mentioned that the "cosmos" card in the playing of the game is the high power card and always trump. The planet suit of cards is also a trump suit but of a lower value than an arbitrarily selected element suit. Thus every game is played with the "cosmos" card and two distinct suits of trumps as well as three remaining nontrump suits, and it will be readily apparent that trump cards are higher than any of the nontrump cards when played in the same trick. The trump cards are those cards which score all of the points excepting those which are won by majority of the cards, it being understood that during the use or playing of the game, that when all players have played one card apiece, this is collectively termed a trick. In each of the element suits, the triplicity cards rank higher than the spot cards, although any spot card of the trump element suit is of a higher power and takes a triplicity card of a non-trump element suit. Of the spot cards, those having twelve spots are highest, the others less in value in their order down to the one-spot, and any of the non-trump element cards have power to take tricks when they are the highest cards played having no trumps in the trick.

The following rules are preferably adapted to the proper manipulation of the game. The pack is thoroughly shuffled, the player to the right cutting the cards, while the player to the left is called upon to name a trump suit from one of the four elements fire, earth, air and water, the selected element suit throughout the game being the trump element suit and predominating over the planet suit of twelve cards as hereinbefore stated. The dealer then proceeds to deal one card from the top of the pack to the center of the table, face downward and unseen, then dealing one card at a time from the top of the pack to each player beginning at his left. The deal is thus repeated until all of the players receive six cards each, one card only having been dealt to the table when there are two, three, four or six players in the game. Should there be five players the dealer will deal three cards to the table at the beginning and the one or three cards as the case may be remain on the table center until the whole pack has been dealt and played, the player taking the last trick being then entitled to the cards dealt to the center of the table. The play then begins with the player on the dealer's left all players following suit when able, whether trump or non-trump leads, with two exceptions hereinafter referred to. If the trump element suit leads, it calls for cards of that particular suit of trumps, not having that, a player should follow with a trump of the planet suit, and vice versa, if he holds any such. Not being able to follow with either kind of a trump card, a non trump card must be played. The highest card played takes the trick, and the player taking the trick wins all the points contained in said trick. Each plays in rotation to the left and when all cards held in the hands have been played, the dealer again deals from the unexhausted pack in the same manner hereinbefore described continuing until the whole pack has been dealt. Each player now counts the points he has won in accordance with the table of values as follows:

One (1) "cosmos" card scores 10 points.

Three (3) triplicity trump cards, 4 points each, score 12 points.

Twelve (12) spot trump cards, 3 points each, score 36 points.

One (1) sun card scores 2 points.

One (1) dragon's head card scores 1 point.

One (1) dragon's tail scores 1 point.

Nine (9) other planet cards, 1 point each, score 9 points.

Twenty-eight (28) trump cards score 71 points.

Majority of cards score either 1 or 2 points, according to the rules.

The three triplicity cards (god, goddess, and demigod) of a given suit are of equal value, but in the event that more than one of the three of the same suit should be played in a trick, the first played has the precedence over the other two.

Of the planet cards, the sun card is the highest, while the others are of equal value. When more than one of them are played in the same trick, the precedence belongs to the planet card first played, the sun excepted. This applies also to the head and tail of the dragon cards when one only of the two dragon cards is in the trick with the other planet cards. Should both the dragon's head and dragon's tail be played in the same trick, the dragon's head always takes the dragon's tail, the sun or any other planet played in that trick and no matter whether or not the head was played first, or other planets first, providing, of course, that no higher trumps have been played. Whenever the dragon's head or tail is played it immediately calls for its other half to be played, regardless of the suit leading, and the point hereinbefore referred to several times is the fact that when the two dragon cards are united in the same trick they "devour" the sun card if played. In the event the second half of the dragon can not be produced, the player must play a planet card or some other trump card in the event he has not the former. If the dragon's demand is unsuccessful, the dragon card played is taken up with the trick and the demand ceases. The holder of the "cosmos" card may, if he chooses, play it instead of complying to the demand of the dragon in that case the "cosmos" card in turn demands the highest card of each of the players following and the dragon is deprived of any further power since the "cosmos" card is absolute and may not be commanded.

Should a player fail to follow suit when able to do so, it is a revoke, the penalty being the loss of two points for each revoke made, which is taken from the player in error at the end of the game. Should the trick have been taken by the revoker, he must hand it over to its rightful owner.

The winner of the game is now entitled to a reading of his fortune upon the diagram or chart G, termed "the wheel of destiny," which is clearly shown in the drawings Figs. 7ª, 7ᵇ, 7ᶜ, 7ᵈ, to comprise two portions divided by an encircling serpent, the inner portion to be occupied by twelve of the spot or divisional cards. The outer portion of the diagram has the zodiac sign spaces, each space being ruled by the planet indicated below its space, the planet giving its special attributes to the native born in that sign. The cards required to make a wheel are the twelve triplicity cards, twelve spot or divisional cards and the planet suit of twelve cards. The twelve triplicity cards are first selected from the pack, each of said cards having near the ends the names of one of the twelve signs of the zodiac and the dates inclusive belonging to that sign, for instance, "Leo"—July 22d to August 22d. The twelve spaces on the diagram outside the serpent ring correspond with these signs and dates, the spaces are termed zodiac sign spaces and upon said spaces are printed characteristics which apply to the native according to the planet card or cards which will finally be placed thereupon.

The manner in which the winner's fortune is read will now be set forth. The individual or native first gives the date and month of his birth and the reader of the fortune refers to the twelve triplicity cards to select the name of the sign corresponding to this date, then placing both the sun card and the earth card upon the diagram in the sign place of the same name. The native now shuffles and cuts the twelve triplicity cards and draws one. The sign which he draws represents the "rising sign" at the hour of his birth. If, for instance, he draws "Gemini," that being one of the air signs, the twelve spot or divisional cards bearing the design in accordance with the "Gemini" card are selected from the pack. The number 1 spot or divisional card is placed upon the card-like space directly beneath the "Gemini" sign space and the remaining spot or divisional cards are placed to the left of the No. 1 card in the spaces marked for them in regular order from one spot to twelve spots. These twelve houses or divisional spot cards qualify the twelve planet cards and the twelve planet cards qualify the twelve spot cards according to which house or divisional spot card is found in direct line with the planet card or cards immediately above. For instance, if the planet "Mars" were in the sign space above that of the house space of the rising sign, it would give the native aggressive, militant, passionate, and energetic characteristics, and more especially if the zodiac sign happened to be "Aries" or "Scorpio" in which "Mars" is the natural ruler. In a similar manner do all the other house cards and planet cards qualify each other in the "cosmos" wheel of destiny reading. The native shuffles and cuts at this point, the ten remaining planet cards and the reader places the topmost card on the sign space which is directly above the one-spot or divisional card, so as not to cover the printing near the serpent ring, the rest of the planet cards are placed in rotation to the left of this until all have been placed on the wheel, there being but one deviation regarding rotation. This deviation is to always place the second half of the dragon in the sign space directly opposite the space in which the first half of the dragon was placed. The wheel is now ready to read, having twenty-four cards all in their correct positions upon the chart. On the sign space covered by the planet cards, it is now read how a particular planet being in that particular sign affects the native, thus:—For Jupiter in the Sagittarius sign will be found these words in the sign's space "Jupiter's dignity"; "compassionate and religiously inclined"; and on the Jupiter planet card these words: "Jove, Jupiter, Zeus, the permanent individuality, natural ruler in Sagittarius, the compassionate helper, and jovial rewarder to the Egos that have evolved through many incarnations of good Karma; his metal is tin." The reading of characteristics on the cards and on the sign spaces occupied by cards, proceeds in this manner constituting the native's fortune. It is understood that the qualities of the house or divisional spot cards must be considered in reading what is in the sign spaces, and what is on the planet cards which are immediately above these house or divisional spot cards.

From the foregoing it will be readily understood that the game will afford considerable pleasure as well as impart knowledge of astrology to the players in a most interesting and instructive manner.

In conclusion, it may be noted that the game is also cabalistic, since the cabalistic numbers 144, (1+4+4=9, and 360 degrees, or 3+6+0=9) are represented in the game. The players interested in the cabalistic numbers may play in "nines" by allowing one point only for the majority of cards. This gives seventy-two points instead of seventy-three hereinbefore referred to. The game for such a play would be for 144 points at least and these 144 points stand for the 144 sub-divisional sections on the evolution serpent circle of the "cosmos" chart or diagram representative of the wheel of destiny. This game can also be played for 360 points which stand for the 360 degrees sections on this evolution serpent circle of the "cosmos" wheel chart. To the student of cabala or occult science, this play would have a clear meaning. The cabalistic number 72 or 7+2=9 or all in the cosmos and the cabalistic number 73 or 7+3=10 or 1+0=1 or the unity of all, the oneness of the "cosmos."

In addition to the ruling planet symbols in the left hand of each of the gods, goddesses and demigods cards of the four element triplicity suits are the following symbols, viz: fire, flaming torch; earth, Pars Fortuna (circle inclosing a cross); air, Mercury's rod; and water, Neptune's trident.

The chart of destiny wheel has a swastika symbol in red and black representative of its axle or revolving center. The twelve zodiac signs' names and their symbols on the chart are colored corresponding to the twelve house division colors represented on the cosmos card's design. Also the twelve card-like spaces inside the serpent circle of the cosmos wheel of destiny chart representing the twelve houses are colored corresponding to the twelve house divisions on the cosmos card's design, and are colored in the following order, viz: Aries, red; Taurus, red-orange; Gemini, orange; Cancer, orange-yellow; Leo, yellow; Virgo, yellow-green; Libra, green; Scorpio, green-blue; Sagittarius, blue; Capricornus, blue-purple; Aquarius, purple; Pisces, purple-red or violet. The cosmos card has a black swastika symbol in the center of its wheel-like design.

Having thus described my invention, what I claim as new and desire to secure by Letters Patent is:

1. A game of playing cards, comprising a "cosmos" card representative of the universe in that it bears thereon a figure separated into twelve divisions distinguished by signs of the zodiac arranged in natural order one in each division, a symbol indicative of the ruling planet of such division being associated with each division zodiac sign, and a plurality of suits of cards each comprising pip cards bearing thereon the signs of certain zodiac divisions borne by the said "cosmos" card, together with a set of triplicity cards having zodiac indicia corresponding with those of the pip cards and the said triplicity cards also having thereon the names of the zodiac signs of the "cosmos" card.

2. A game of playing cards, comprising a "cosmos" card representative of the universe in that it bears thereon a figure separated into twelve divisions distinguished by signs of the zodiac arranged in natural order one in each division, a symbol indicative of the ruling planet of such division being associated with each division zodiac sign, and a plurality of suits of cards each comprising pip cards bearing thereon the signs of certain zodiac divisions borne by the said "cosmos" card, together with a set of triplicity cards having zodiac indicia corresponding with those of the pip cards and the said triplicity cards also having thereon the names of the zodiac signs of the "cosmos" card, the pip and triplicity cards of each suit being also provided with corresponding designs establishing the unity of the suit, and the said designs of each suit being distinguished from the designs of the others.

3. A game of cards comprising a "cosmos" card having divisions distinguished by signs of the zodiac arranged in natural order; a suit of planet cards each containing thereon an illustration personifying a certain planet together with a symbol identifying such particular planet so each card is distinguished from the others of this suit; and a plurality of suits of cards representative of the elements fire, earth, water and air, each of the latter suits consisting of a predetermined number of pip cards and certain triplicity cards, the cards of each of said element suits having a design common to said cards but the designs for the different suits being of distinguishing shapes and colors; the triplicity cards of each element suit being provided with human-like representations of the ruling powers of the element of which they are symbolic, with symbols corresponding to those of a plurality of the planet cards and symbolic of the ruling planets of said suit, with a sign indicative of the particular element represented by the suit, and with a design of the particular constellation belonging to each especial triplicity card.

4. In game apparatus, a chart divided into a group of zodiac sign spaces each space containing the twelve signs of the zodiac and descriptions of characteristics applicable to natives born in said signs, a designation of the ruling planet and the dates inclusive belonging thereto being associated with each sign space, a series of card spaces provided opposite the sign spaces, a series of cards each bearing thereon the name of a particular sign of the zodiac and the dates inclusive belonging to that sign and thereby associating each of said cards with a certain one of the sign spaces, another series of cards consisting of planet cards disposable on the zodiac sign spaces of the chart and distinguished from one another by the different names of planets and illustrations also significant of the latter, and still another series of cards disposable in the card spaces of the chart and distinguished from one another by indicia comprising the names of the astrological houses of the zodiac, the planet cards aforesaid bearing indicia qualifying that of the last mentioned series of cards and qualified thereby, and designs associating the cards of the last named with those of the first named series.

In testimony whereof I affix my signature in presence of two witnesses.

ALBERT FRANKLIN FIELDS.

Witnesses:
    ADA J. DOWELL,
    MOSELLE A. FIELDS.

Copies of this patent may be obtained for five cents each, by addressing the "Commissioner of Patents, Washington, D. C."

Correction in Letters Patent No. 1,139,356.

It is hereby certified that in Letters Patent No. 1,139,356, granted May 11, 1915, upon the application of Albert Franklin Fields, of Alhambra, California, for an improvement in "Game Apparatus," an error appears in the printed specification requiring correction as follows: Page 6, line 5, after the word "containing" insert the words *one of;* and that the said Letters Patent should be read with this correction therein that the same may conform to the record of the case in the Patent Office.

Signed and sealed this 27th day of July, A. D., 1915.

[SEAL.]
R. F. WHITEHEAD,
*Acting Commissioner of Patents.*